(12) United States Patent
Hu et al.

(10) Patent No.: US 8,553,173 B2
(45) Date of Patent: Oct. 8, 2013

(54) LIQUID CRYSTAL DISPLAY

(75) Inventors: Che-chang Hu, Shenzhen (CN);
Kuang-Yao Chang, Shenzhen (CN);
Kuojun Fang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 56 days.

(21) Appl. No.: 13/318,359

(22) PCT Filed: Jul. 25, 2011

(86) PCT No.: PCT/CN2011/077531
§ 371 (c)(1),
(2), (4) Date: Oct. 31, 2011

(87) PCT Pub. No.: WO2013/010335
PCT Pub. Date: Jan. 24, 2013

(65) Prior Publication Data
US 2013/0016301 A1 Jan. 17, 2013

(30) Foreign Application Priority Data
Jul. 15, 2011 (CN) .......................... 2011 1 0199402

(51) Int. Cl.
*G02F 1/1333* (2006.01)

(52) U.S. Cl.
USPC .......................................................... 349/58

(58) Field of Classification Search
USPC .......................................................... 349/58
See application file for complete search history.

(56) References Cited

U.S. PATENT DOCUMENTS
6,177,971 B1 * 1/2001 Jung et al. ....................... 349/60

* cited by examiner

*Primary Examiner* — Lucy Chien
(74) *Attorney, Agent, or Firm* — Cheng-Ju Chiang

(57) ABSTRACT

A liquid crystal display (LCD) is disclosed. The LCD comprises a front frame, a panel, a plastic frame and an optical film assembly. The panel comprises a display region and a non-display region, and the plastic frame and the front frame cooperate with each other to sandwich the non-display region of the panel therebetween. The plastic frame is formed with a V-groove(s) on a surface thereof that faces towards a light exiting surface of the optical film assembly. In this way, light rays traveling through the optical film assembly to the lower surface of the plastic frame are reflected by the V-groove(s) so as to be mostly concentrated onto the non-display region of the panel and then gradually attenuated to disappear. This can reduce the bright lines appearing in the display region of the panel and, consequently, improve the displaying effect of the whole LCD.

7 Claims, 4 Drawing Sheets

LIQUID CRYSTAL DISPLAY

FIELD OF THE INVENTION

The present disclosure generally relates to the technical field of displaying, and more particularly, to a liquid crystal display (LCD).

BACKGROUND OF THE INVENTION

With advancement of the science and technology, liquid crystal displays (LCDs) have found wide application in people's daily life. Referring to FIG. 1, there is shown a schematic side view of a prior art LCD. The prior art LCD comprises a front frame 110, a panel 120, a plastic frame 130 and an optical film assembly 140. The panel 120 comprises a display region (not shown) and a non-display region (not shown). The front frame 110 and the plastic frame 130 cooperate with each other to sandwich the non-display region of the panel 120 therebetween for fixing the panel 120. A lower surface 131 of the plastic frame 130 faces towards a light exiting surface of the optical film assembly 140 and is of a uniform planar structure.

Referring to FIG. 2, there is shown an enlarged view of an area A of FIG. 1. In the prior art, light rays exiting from the optical film assembly 140 are scattered by the lower surface 131 of the plastic frame 130, and then concentrated in an area D corresponding to the display region of the panel 120 above the optical film assembly 140. This causes appearance of bright lines in the display region of the panel 120, which has an adverse effect on the displaying effect of the whole LCD.

In view of this, it is highly desirable in the art to provide an LCD capable of solving the aforesaid problem of the prior art.

SUMMARY OF THE INVENTION

A primary objective of the present disclosure is to provide a liquid crystal display (LCD) that can avoid generation of bright lines to improve the displaying effect of the whole LCD.

To achieve this objective, the present disclosure provides an LCD. The LCD comprises a front frame, a panel, a plastic frame and an optical film assembly. The panel comprises a display region and a non-display region, and the plastic frame and the front frame cooperate with each other to sandwich the non-display region of the panel therebetween. The plastic frame is formed with a V-groove on a surface thereof that faces towards a light exiting surface of the optical film assembly.

According to a preferred embodiment of the present disclosure, the plastic frame is formed with a plurality of said V-grooves on the surface thereof that faces towards the light exiting surface of the optical film assembly, and each of the V-grooves has a width w of 30 μm≤w≤500 μm.

According to a preferred embodiment of the present disclosure, the plastic frame is formed with a plurality of said V-grooves on the surface thereof that faces towards the light exiting surface of the optical film assembly, and a distance between adjacent ones of the V-grooves is greater than or equal to the width of each of the V-grooves.

According to a preferred embodiment of the present disclosure, the plastic frame is formed with a plurality of said V-grooves on the surface thereof that faces towards the light exiting surface of the optical film assembly, and a distance between adjacent ones of the V-grooves is equal to the width of each of the V-grooves.

According to a preferred embodiment of the present disclosure, the width of each of the V-grooves is smaller than a thickness of the plastic frame, two bevel edges of each of the V-grooves include angles $\alpha$, $\beta$ with a horizontal line respectively, and $\alpha=90°$, $\beta\geq45°$.

According to a preferred embodiment of the present disclosure, $45°\leq\alpha\leq65°$.

According to a preferred embodiment of the present disclosure, the width of each of the V-grooves is smaller than the thickness of the plastic frame, the two bevel edges of each of the V-grooves include angles $\alpha$, $\beta$ with the horizontal line respectively, and $\beta=90°$, $\beta\geq90°$.

According to a preferred embodiment of the present disclosure, $45°\leq\alpha\leq65°$.

According to a preferred embodiment of the present disclosure, the two bevel edges of each of the V-grooves include angles $\alpha$, $\beta$ with the horizontal line respectively, and $\alpha<90°$, $\beta<90°$.

According to a preferred embodiment of the present disclosure, $\alpha<70°$, $\beta<70°$.

According to a preferred embodiment of the present disclosure, $\alpha=\beta=45°$.

According to a preferred embodiment of the present disclosure, the plastic frame is formed with only one said V-groove on the surface thereof that faces towards the light exiting surface of the optical film assembly.

The present disclosure has the following benefits: as compared to the prior art, the LCD of the present disclosure has a V-groove(s) formed on the lower surface of the plastic frame. As a result, light rays traveling through the optical film assembly to the lower surface of the plastic frame are reflected by the V-groove(s) so as to be mostly concentrated onto the non-display region of the panel and then gradually attenuated to disappear. This can reduce the bright lines appearing in the display region of the panel and, consequently, improve the displaying effect of the whole LCD.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

The present disclosure is more particularly described in the following examples that are intended as illustrative only since numerous modifications and variations therein will be apparent to those skilled in the art.

Figure 1:
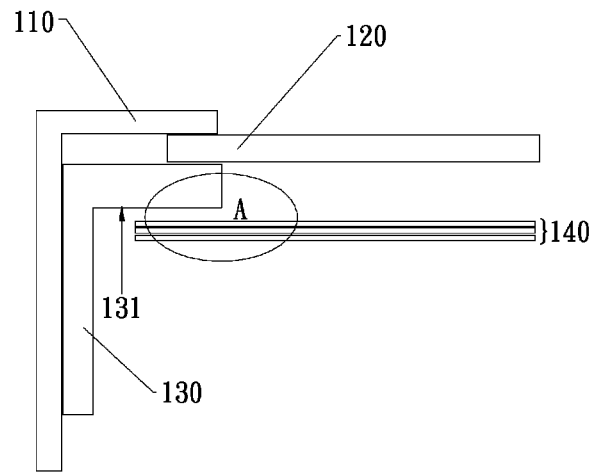
FIG. 1 is a schematic side view of a prior art liquid crystal display (LCD).
Figure 2:
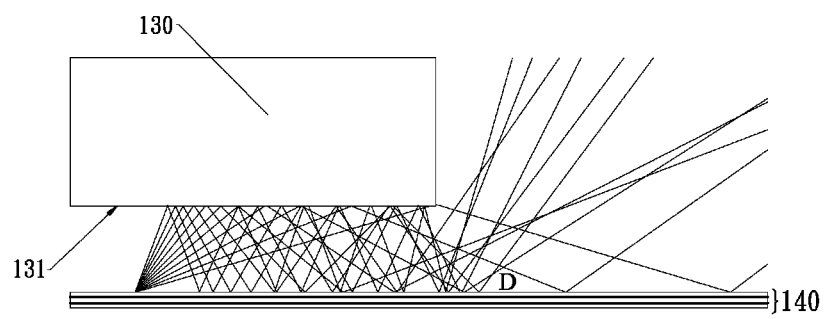
FIG. 2 is a schematic enlarged view of an area A shown in FIG. 1.
Figure 3:
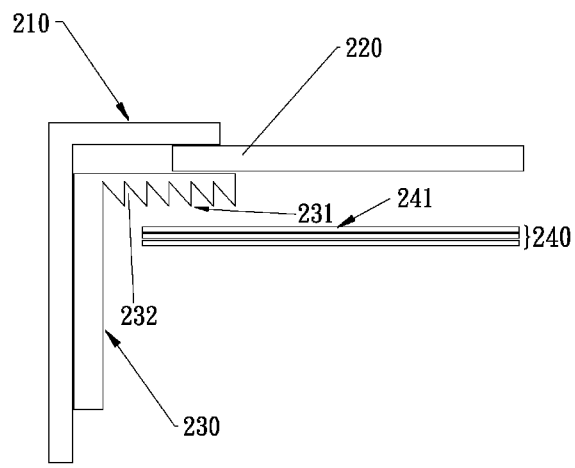
FIG. 3 is a side view of an LCD according to a first embodiment of the present disclosure.

Referring to FIG. 3, there is shown a side view of an LCD according to a first embodiment of the present disclosure. The LCD of the present disclosure comprises a front frame 210, a panel 220, a plastic frame 230 and an optical film assembly 240. The panel 220 comprises a display region (not labeled) and a non-display region (not labeled). The front frame 210 and the plastic frame 230 cooperate to sandwich the non-display region of the panel 220 therebetween for fixing the panel 220. The plastic frame 230 is formed with a plurality of V-grooves 232 on a lower surface 231 thereof that faces towards a light exiting surface 241 of the optical film assembly 240. Light rays are reflected by the V-grooves 232, most of the light rays are confined within the non-display region between the plastic frame 230 and the optical film assembly 240 until they are gradually attenuated to disappear completely. Thus, bright lines appearing in the display region are reduced.

Figure 4:
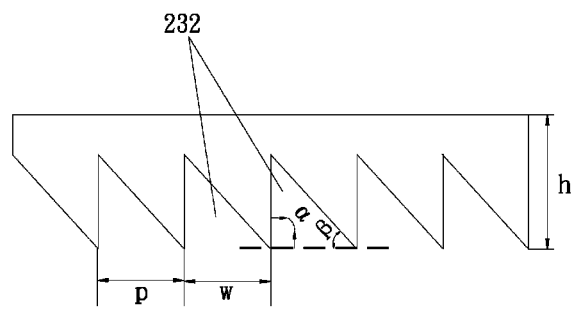
FIG. 4 is a schematic view of V-grooves in the LCD shown in FIG. 3.

Referring to FIG. 4, there is shown a schematic view of V-grooves in the LCD shown in FIG. 3. As shown in FIG. 4, h represents a thickness of the plastic frame, p represents a distance between every two adjacent V-grooves 232, and w represents a width of each of the V-grooves 232. Preferably in this embodiment, p=w. In other embodiments, p may be determined to be p≥w. The width w of each of the V-grooves 232 ranges between 30 μm and 500 μm. $\alpha$ and $\beta$ represent angles included between two bevel edges of each of the V-grooves 232 and a horizontal line. It is known from simulation tests that, given that the values of $\alpha$ and $\beta$ are fixed, a greater value of w results in a better effect of reducing the bright lines.

Given that the value of h is fixed, the values of w, $\alpha$ and $\beta$ will be correlated with each other; therefore, the values of $\alpha$ and $\beta$ may be set by adjusting the value of w. In this embodiment, w<h, $\alpha$=90, $\beta$≥45° and, preferably, 45°≤$\beta$≤65°. As is known from simulation tests, a greater value of $\beta$ results in a better effect of reducing the bright lines.

In other embodiments, when w has a great value (e.g., w≥h) and $\beta$=90°, it is impossible for $\alpha$ to have a value of greater than 45°; and in this case, $\alpha$ can only have a value of smaller than or equal to 45° instead.

Figure 5:
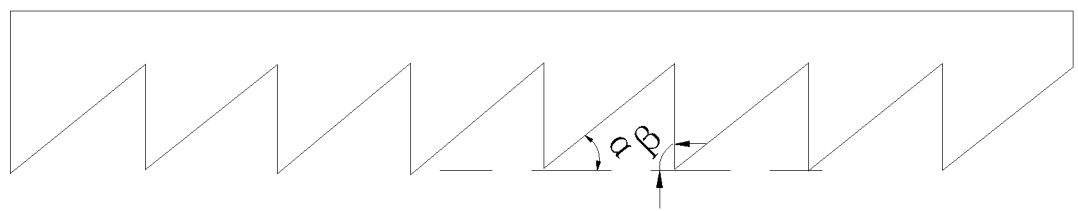
FIG. 5 is a schematic view of V-grooves in an LCD according to a second embodiment of the present disclosure.

Referring to FIG. 5, there is shown a schematic view of V-grooves in an LCD according to a second embodiment of the present disclosure. The V-grooves of the LCD according to the second embodiment are substantially the same as those of the LCD according to the first embodiment except that $\beta$=90°, $\alpha$≥45°, and preferably, 45°≤$\alpha$≤65°. It is known from simulation tests that, the greater the value of a is, the weaker the bright lines will be. Additionally, it is known from simulation tests that, bright lines are weaker when $\alpha$<$\beta$ than when $\alpha$>$\beta$, so the LCD of the second embodiment delivers a better effect of reducing the bright lines than that of the first embodiment.

Figure 6:
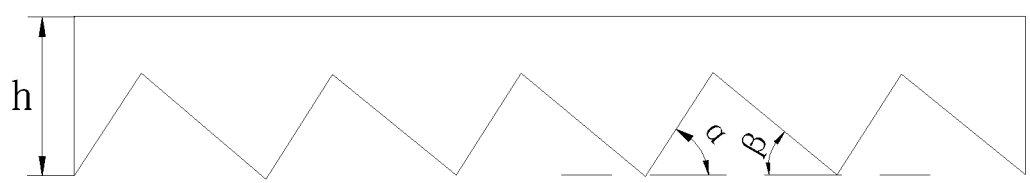
FIG. 6 is a schematic view of V-grooves in an LCD according to a third embodiment of the present disclosure.

Referring to FIG. 6, there is shown a schematic view of V-grooves in an LCD according to a third embodiment of the present disclosure. The V-grooves of the LCD according to the third embodiment are substantially the same as those of the LCD according to the first embodiment except that $\alpha$<90°, $\beta$<90°. Because the thickness h of the plastic frame is usually relatively small and on the order of magnitude of millimeters (mms) (e.g., between 0.05 mm and 50 mm), and the width w of each V-groove ranges between 0.03 mm and 0.5 mm, the values of $\alpha$ and $\beta$ are usually smaller than or equal to 70° as restricted by the values of h and w. It is known from simulation tests that, in case of $\alpha$=$\beta$, the bright lines become weakest when $\alpha$=$\beta$=45°, so it is preferred that $\alpha$=$\beta$=45°.

Moreover, as compared to the first embodiment, the LCD of the third embodiment delivers a slightly poorer effect of reducing the bright lines than the LCD of the first embodiment when p=w and $\alpha$=$\beta$=45°.

Figure 7:
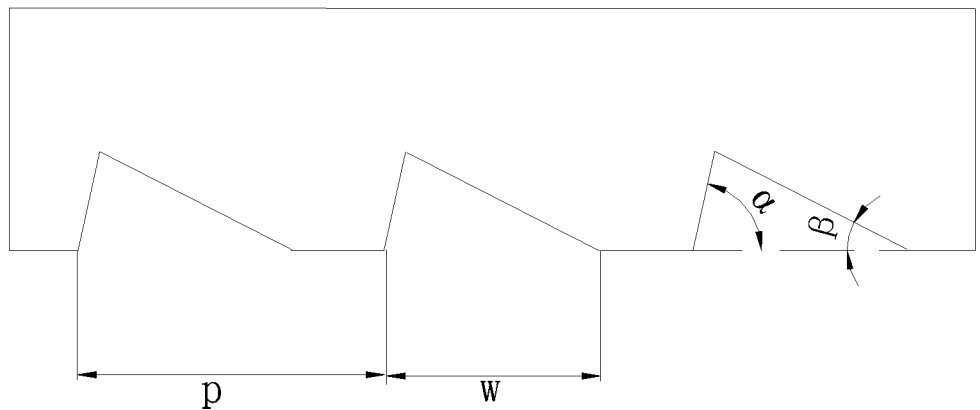
FIG. 7 is a schematic view of V-grooves in an LCD according to a fourth embodiment of the present disclosure.

Referring to FIG. 7, there is shown a schematic view of V-grooves in an LCD according to a fourth embodiment of the present disclosure. In this embodiment, p>w, $\alpha$<90°, $\beta$<90°, and the V-grooves are disposed at intervals. The LCD of the fourth embodiment delivers a slightly poorer effect of reducing the bright lines than that of the third embodiment, but can still reduce the bright lines to some extent.

Figure 8:
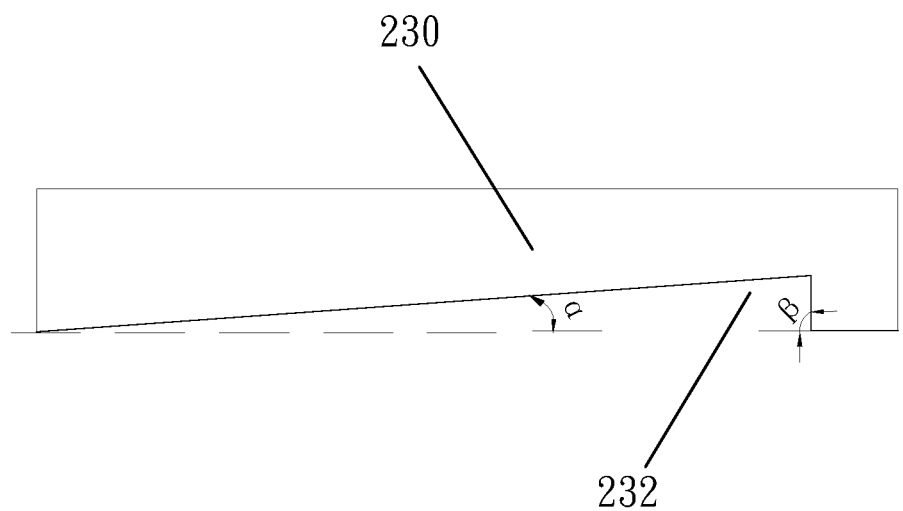
FIG. 8 is a schematic view of V-grooves in an LCD according to a fifth embodiment of the present disclosure.

Referring to FIG. 8, there is shown a schematic view of V-grooves in an LCD according to a fifth embodiment of the present disclosure. In this embodiment, only one V-groove 232 is formed on the lower surface of the plastic frame 230 to reduce the bright lines. In this embodiment, $\alpha$≤45°, and $\beta$=90°. In other embodiments, $\alpha$ and $\beta$ may also be set to be other values.

As compared to the prior art, the LCD of the present disclosure has a V-groove(s) formed on the lower surface of the plastic frame 230. As a result, light rays traveling through the optical film assembly 240 to the lower surface 231 of the plastic frame 230 are reflected by the V-groove(s) so as to be mostly concentrated onto the non-display region of the panel 220 and then gradually attenuated to disappear. This can reduce the bright lines appearing in the display region of the panel 220 and, consequently, improve the displaying effect of the whole LCD.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A liquid crystal display (LCD), comprising a front frame, a panel, a plastic frame and an optical film assembly, the panel comprising a display region and a non-display region, and the plastic frame and the front frame cooperating with each other to sandwich the non-display region of the panel therebetween, wherein the plastic frame is formed with a V-groove on a surface thereof that faces towards a light exiting surface of the optical film assembly, the plastic frame is formed with a plurality of said V-grooves on the surface thereof that faces towards the light exiting surface of the optical film assembly, and a distance between adjacent ones of the V-grooves is greater than or equal to the width of each of the V-grooves, the two bevel edges of each of the V-grooves include angles $\alpha$, $\beta$ with the horizontal line respectively, and $\alpha$<70°, $\beta$<70°.

2. The LCD of claim 1, wherein each of the V-grooves has a width w of 30 μm≤w≤500 μm.

3. The LCD of claim 1, wherein the distance between adjacent ones of the V-grooves is equal to the width of each of the V-grooves.

4. The LCD of claim 1, wherein the distance between adjacent ones of the V-grooves is equal to the width of each of the V-grooves, and the width of each of the V-grooves is smaller than a thickness of the plastic frame.

5. The LCD of claim 4, wherein 45°≤$\beta$≤65°.

6. The LCD of claim 4, wherein 45°≤$\alpha$≤65°.

7. The LCD of claim 1, wherein $\alpha$=$\beta$=45°.

* * * * *